E. L. HARTMANN.
Friction Clutch and Coupling.
No. 222,040. Patented Nov. 25, 1879.

WITNESSES
Chas. F. Tietze
Henry Howson Jr.

INVENTOR
Ernest L. Hartmann,
by his attorney,
Howson

UNITED STATES PATENT OFFICE.

ERNEST LOUIS HARTMANN, OF PHILADELPHIA, PENNSYLVANIA, ASSIGNOR TO THOMAS CUNNINGHAM, HORATIO B. LINCOLN, GEORGE BROWN, LUCIAN BROWN, FRANK P. PENDLETON, AND HERMAN E. CUNNINGHAM, ALL OF SAME PLACE.

IMPROVEMENT IN FRICTION CLUTCHES AND COUPLINGS.

Specification forming part of Letters Patent No. 222,040, dated November 25, 1879; application filed August 21, 1879.

*To all whom it may concern:*

Be it known that I, ERNEST LOUIS HARTMANN, of Philadelphia, Pennsylvania, have invented a new and useful Improvement in Friction Clutches and Couplings, of which the following is a specification.

My invention relates to improvements in that class of friction-clutches or friction-couplings in which a carrier on a shaft and a spring-ring are combined with mechanism for contracting the said ring to and releasing it from the hub of a pulley or wheel, or an enlargement on a shaft, my invention being an improvement on that described in the reissued Letters Patent No. 8,518, granted to F. G. Bates and Chas. E. Burwell, December 10, 1878, the original patent bearing date November 24, 1874.

The main object of my invention is to insure the positive action of the clutch should the friction-ring fail to perform its duty.

Figure 1:
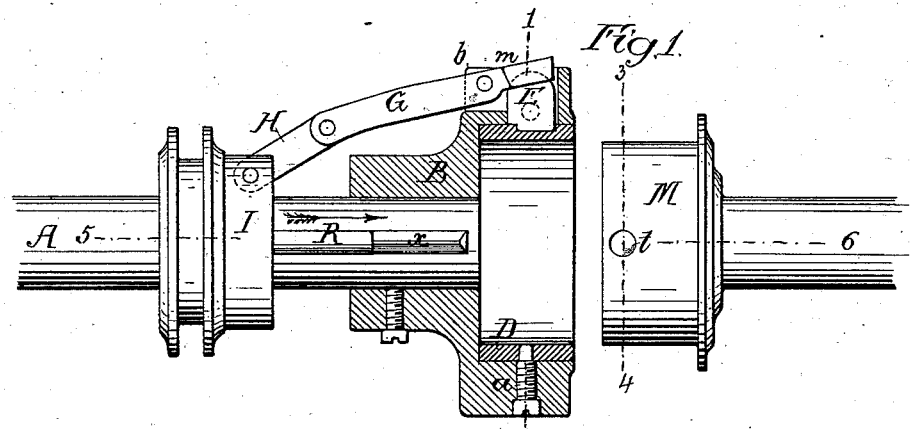
Figure 4:
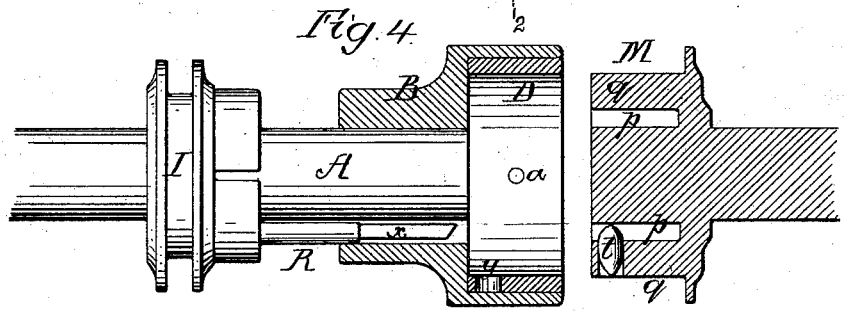
Figure 2:
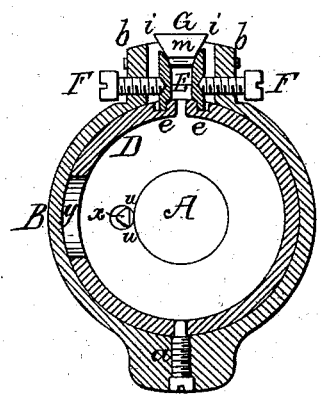
Figure 3:
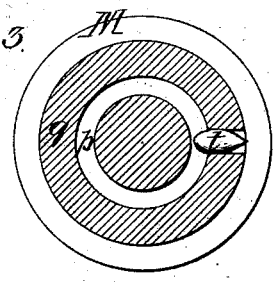
Figure 5:
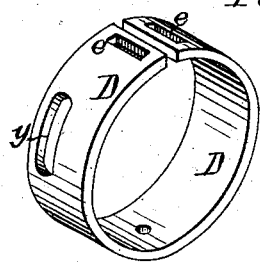
Figure 6:
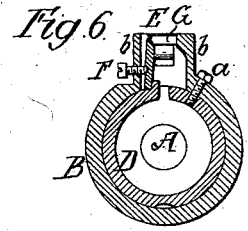

In the accompanying drawings, Figure 1 is a side view, partly in section, of my improved friction-clutch, showing the clutching device detached from the object to be clutched; Fig. 2, a transverse section on the line 1 2; Fig. 3, a section on the line 3 4; Fig. 4, a longitudinal section on the line 5 6; Fig. 5, a perspective view of the friction-ring, and Fig. 6 a modification of the clutch.

In Figs. 1, 2, 3, and 4, A is the driving-shaft, to which is secured a carrier, B, the latter having a circular recess for the reception of a severed spring-ring, D, which is connected at a point midway, or thereabout, between its two ends by a set-screw, $a$, to the carrier.

Notches or recesses $e\ e$ are made in the ring, one near each end of the same, each notch receiving the end of the short arm of a lever, E, and each lever having its fulcrum on the rounded point of a set-screw, F, which fits into a cavity in the lever, and which screws into a lug, $b$, projecting from the carrier, the fulcrum of each lever being thus made adjustable. A lever, G, is pivoted to the lugs $b\ b$ of the carrier, and the long arm of this lever is connected by a link, H, to a sleeve, I, which may be moved to and fro on the shaft A by a suitable lever.

The short arm, $m$, of the lever G is made wedge-shaped, its opposite edges $i\ i$ being beveled in contrary directions, as shown in Fig. 2, and arranged to bear against the beveled upper end of the long arms of the two levers E E.

On sliding the sleeve I in the direction of the arrow, the long arm of the lever G will be moved away from the shaft, and its short arm, being moved toward the same, will have a wedge-like action on the two levers E E, tending to force them apart and to move the short arms toward each other, thereby contracting the spring-ring D and binding it to a hub, M, which may be part of a pulley-wheel or an enlargement on a shaft in line with the shaft A, the pulley wheel or shaft consequently revolving with the said shaft A.

When the sleeve I is moved in a direction contrary to that pointed out by the arrow the long arm of the lever will be moved toward the shaft, and the short arm in a contrary direction, the levers E E will be relieved from the wedge-like action of the said short arm, and the spring-ring, owing to its inherent elasticity, will expand and release the hub M of the wheel or pulley or the enlargement on the shaft.

If desired, the wedge which acts on the levers may be separate from the lever G, in which case the said arm will bear directly on the wedge proper, provision being made for preventing the separate wedge from being misplaced.

The importance of making the fulcrum of the two levers E E adjustable will be readily understood without explanation.

Instead of using two levers, E E, in connection with a split ring hung at the center to the carrier B, the ring may be secured to the carrier at one end, and a single lever, E, for acting on the other end of the ring, may be used.

In the hub M is made an annular groove, $p$, so as to form a rim, $q$, in a hole bored through which fits a pin, $t$, pointed at its outer end and rounded at its inner end. To the sleeve I is attached a rod, R, which is arranged to slide in a groove in the hub of the carrier B, the outer portion, $x$, of this rod having two beveled edges, $u\ u$, as seen in Fig. 2. When the hub M is within the ring D and the sleeve I is moved forward in the direction of the arrow, and the ring is thereby caused to embrace the hub in the manner described above, the portion $x$ of the rod R will occupy a position within the annular groove $p$ of the hub, where, however, it performs no function so long as there is no slip of the ring on the hub; but should the hub fail to turn with the ring D one of the beveled edges of the portion $x$ of the rod R will strike the inner end of the pin $t$ and tend to force said pin outward. When, by the continued slipping of the ring on the hub, the pin $t$ coincides with an opening, $y$, in the ring, it will be forced into the said opening, and the ring must consequently be rigidly locked to the hub, and must remain in this locked condition as long as the pin is under the control of the rod R; but on moving back the sleeve I, and with it the rod R, the ring D will be expanded from the hub, and the pin, being no longer controlled by the rod, will be thrust inward by the action of the edge of the opening $y$ in the ring on the rounded outer end of the pin.

It will be understood that this locking device is not brought into play whenever the ring is contracted to the hub by moving the sleeve in the direction of the arrow. It is only in emergencies—as, for instance, when the fulcrums of the levers E have not been properly adjusted, or when the strain on the driven shaft is so excessive as to overcome the friction of the ring—that the locking-pin is brought into play.

I claim as my invention—

1. The combination, in a friction-clutch, of a locking-pin, $t$, carried by the hub, the carrier and its friction-ring having an opening, $y$, and devices, substantially as described, whereby the pin $t$ is caused to enter the said opening when the ring, after being contracted to the hub, fails to perform its duty.

2. The combination of the shaft A, the carrier, its ring having an opening, $y$, and the sleeve and rod R, with the hub M, its annular recess $p$, and pin $t$.

In testimony whereof I have signed my name to this specification in the presence of two subscribing witnesses.

ERNEST LOUIS HARTMANN.

Witnesses:
 ALEXANDER PATTERSON,
 HARRY SMITH.